United States Patent
Shin et al.

(10) Patent No.: US 8,385,935 B2
(45) Date of Patent: Feb. 26, 2013

(54) METHOD FOR CONTROLLING OF RADIO RESOURCE AND MOBILE TELECOMMUNICATION SYSTEM FOR THE SAME

(75) Inventors: Hong Sup Shin, Seoul (KR); Yong Hoon Lim, Suwon-si (KR)

(73) Assignee: LG-Ericsson Co., Ltd., Seoul (KR)

( * ) Notice: Subject to any disclaimer, the term of this patent is extended or adjusted under 35 U.S.C. 154(b) by 511 days.

(21) Appl. No.: 12/702,741

(22) Filed: Feb. 9, 2010

(65) Prior Publication Data
US 2010/0216394 A1 Aug. 26, 2010

(30) Foreign Application Priority Data

Feb. 26, 2009 (KR) .................. 10-2009-0016389
Feb. 8, 2010 (KR) .................. 10-2010-0011699

(51) Int. Cl.
*H04W 72/12* (2009.01)
(52) U.S. Cl. .................. 455/452.2; 455/509; 455/67.13; 455/452.1
(58) Field of Classification Search ........... 455/7, 452.2, 455/452.1, 450, 509, 24, 67.11, 67.13, 63.1, 455/69, 68, 115.1, 115.3, 126
See application file for complete search history.

(56) References Cited

U.S. PATENT DOCUMENTS

2010/0120446 A1* 5/2010 Gaal .......................... 455/452.2
2010/0279602 A1* 11/2010 Larsson et al. .................... 455/7

OTHER PUBLICATIONS

LG-Nortel, Nortel; "Self Interference Considerations in Relay Node"; 3GPP TSG RAN1 #56; Athens Greece, Feb. 9-13, 2009; R1-091078.
LG-Nortel; "Self Interference: Measurement and Cancellation"; 3GPP TSG RAN1. #57; San Francisco, CA; May 4-8, 2009; R1-091677.

* cited by examiner

*Primary Examiner* — John J Lee
(74) *Attorney, Agent, or Firm* — KED & Associates, LLP

(57) ABSTRACT

A method for measuring a self-interference (SI) which occurs in a relay and controlling radio resources of a base station based on the measured SI, and a mobile telecommunication system using the same. The mobile telecommunication system includes a relay which calculates intensity of SI; and a base station which performs radio resource management based on the calculated SI intensity. The method for measuring SI includes calculating intensity of SI using a relay; and performing radio resource management at a base station based on the calculated SI intensity.

15 Claims, 4 Drawing Sheets

METHOD FOR CONTROLLING OF RADIO RESOURCE AND MOBILE TELECOMMUNICATION SYSTEM FOR THE SAME

CROSS-REFERENCE TO RELATED APPLICATIONS

The present application claims priority from Korean Patent Application Nos. 10-2009-0016389 (filed on Feb. 26, 2009) and 10-2010-0011699 (filed on Feb. 8, 2010), the entire subject matters of which is incorporated herein by reference.

TECHNICAL FIELD

The present invention relates generally to a mobile telecommunication system, and more particularly, to controlling radio resources with high efficiency based on intensity of self-interference which occurs in a relay node (RN).

BACKGROUND

In general, a relay may often be used to cover electromagnetic wave shadow areas or provide an economical extension of coverage to areas which require expensive base stations with the intention of improving quality of service (QoS) of mobile telecommunications. A relay may generally be classified into a wired relay having one side connected to a base station by a wire such as an optical cable and a wireless relay connected to a base station wirelessly.

A relay may include two antennas to perform simultaneous signal transmission and receipt. For an up-link and a down-link, an antenna may include a signal receiving part, which is often called an "acceptor," and a signal transmitting part, which is often called a "donor." Among other things, a frequency hopping relay and a transparent relay, both of which allocate different frequencies to their respective donors and acceptors, are not so efficient in terms of frequency, although they have no self-interference. On the contrary, a non-transparent relay behaving like a base station can use the same frequency to transmit/receive signals since signals from other base stations do not interfere with the relay, thereby allowing its donor and acceptor resources to be allocated with the same frequency/time band. In addition, an interference cancellation system relay may allocate its donor and acceptor resources to the same frequency/time band. However, for such an interference cancellation system relay, although it may increase its radio frequency use efficiency over the frequency hopping relay or the transparent relay, when it transmits/receives signals at the same time and with the same frequency, an interference signal, which may occur due to a feedback of a signal transmitted by its donor, may have an effect on the reception performance of its acceptor. Such an interference signal, which may occur when the relay uses the same transmission/reception frequency band, is called a "self-interference (SI)," whose intensity is varied between about −100 dB and about −70 dB depending on ambient geographical features.

SUMMARY

According to an aspect of the invention, there is provided a method for measuring a self-interference (SI) which occurs in a relay and controlling radio resources of a base station based on the measured SI, and a mobile telecommunication system using the same.

In one embodiment of the invention, the mobile telecommunication system includes a relay which calculates intensity of SI; and a base station which performs radio resource management based on the calculated SI intensity.

In another embodiment, the method for measuring SI includes calculating intensity of SI using a relay; and performing radio resource management at a base station based on the calculated SI intensity.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
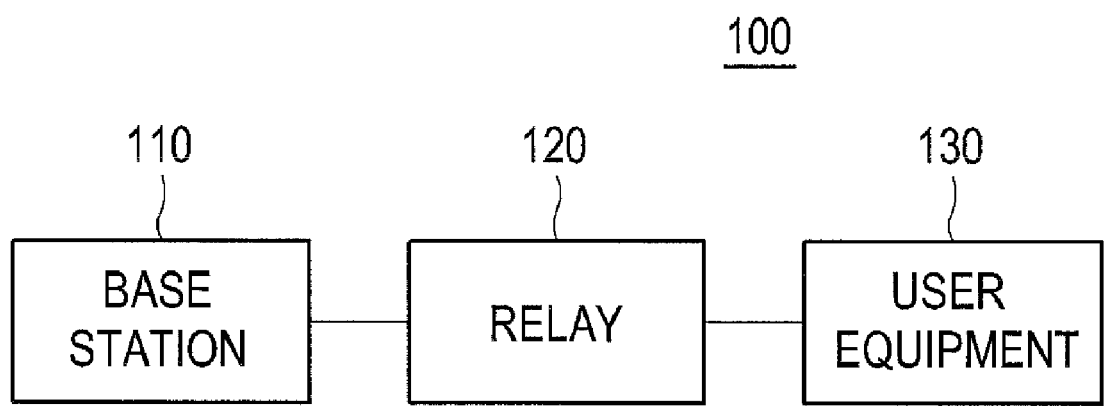
FIG. 1 is a block diagram showing a configuration of a mobile telecommunication system according to an embodiment of the present invention.

FIG. 1 is a block diagram showing a configuration of a mobile telecommunication system according to an embodiment of the present invention. As shown in FIG. 1, a mobile telecommunication system 100 includes a base station 110, a relay 120 and a user equipment 130. The relay 120 is used in some embodiments for covering areas where the base station 110 cannot adequately cover such as shielded spaces or blocked shadow areas (e.g., underground shopping arcades, tunnels, underground parking lots, etc.) or is unable to operate an outside broadcast van at all times. The relay 120 can provide mobile telecommunication services, such as receiving calls from radios and mobile phones in areas hard to cover, for example by extracting a weak signal for relay from signals transmitted from the base station 110 which resides in a shield space or a shadow area, amplifying the extracted weak signal with low noise, and then retransmitting the amplified signal to the user equipment 130 via a re-amplification antenna.

The relay 120 includes an acceptor, which is a receiving part of an antenna to receive signals in an uplink and a down-link, and a donor, which is a transmitting part of another antenna to transmit signals in the uplink and the downlink. It should be noted that the relay 120 uses, but is not limited to, a wireless backhaul for a backhaul link, which eliminates a need to add new base stations or establish a wired backhaul.

In this embodiment, in particular, the relay 120 measures the intensity of self-interference (SI) and reports it to the base station 110. In one embodiment, the SI intensity is measured by using a resource block (RB) stipulated between the base station 110 and the relay 120 or a reference signal (RS) periodically transmitted by the base station 110.

The base station 110 performs a radio resource management using the SI intensity reported by the relay 120. Examples of the radio resource management may include first scheduling to separate RBs of a donor and an acceptor from each other if the SI intensity is high, second scheduling to use RBs of a donor and an acceptor in common if the SI intensity is negligible, and third scheduling to alternate between the first scheduling and the second scheduling depending on a level of SI intensity. Such a radio resource management allows a frequency band A used for a backhaul link between the base station 110 and the relay 120 and a frequency band B used for an access link between the relay 120 and the user equipment 130 to be used as inband or outband in an adaptive manner.

Figure 2:
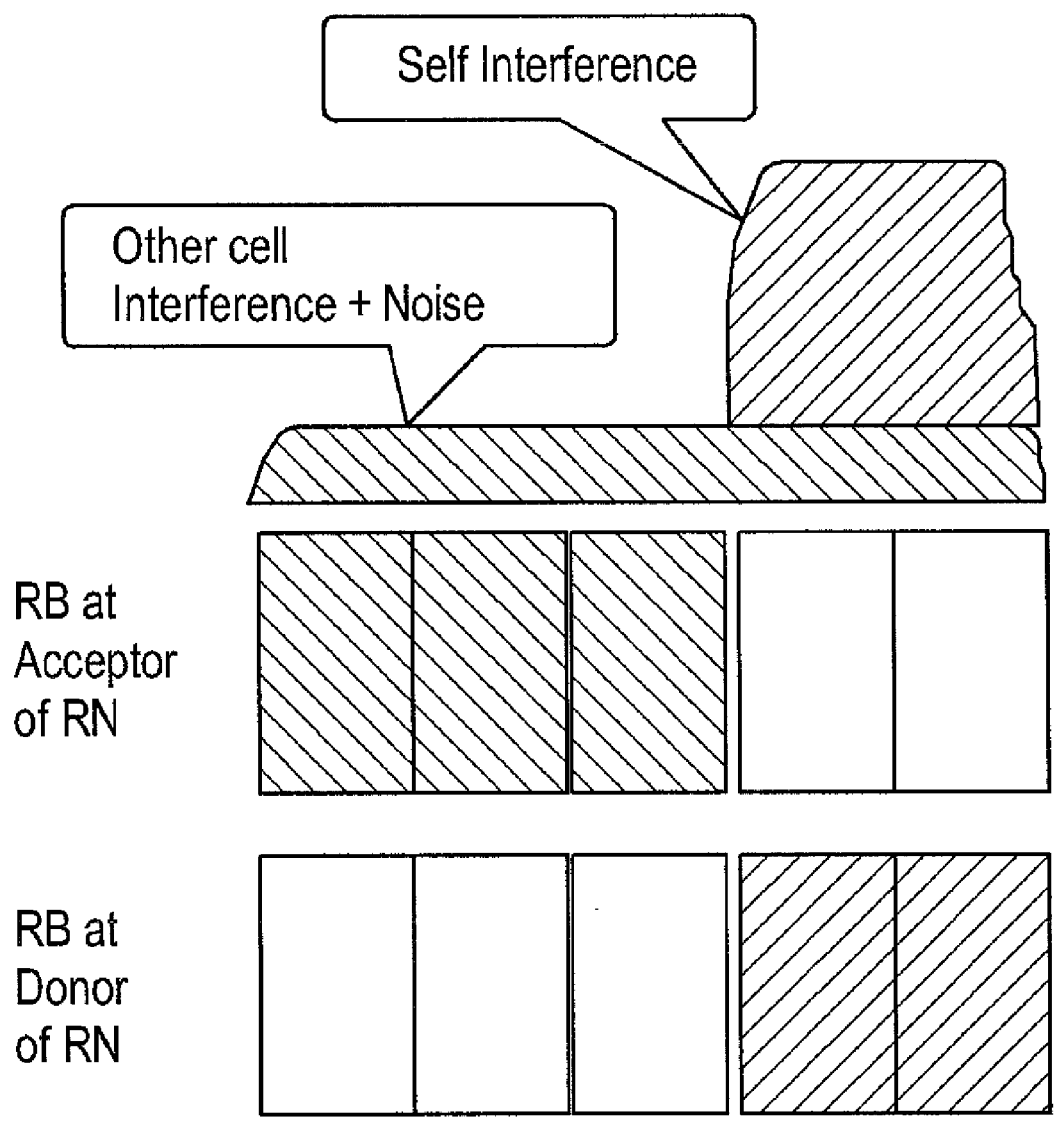
FIG. 2 is an exemplary view for explaining radio resource allocation of a base station according to an embodiment of the present invention.

FIG. 2 is an exemplary view for explaining radio resource allocation of the base station 110 according to an embodiment of the present invention. The relay 120 requests the base station 110 to allocate radio resources for measurement of SI intensity. In this case, the request for allocation of radio resources may be made either periodically or in real time from a request from a relay operator. Alternatively, the base station 110 may allocate radio resources for measurement of SI intensity in the relay 120 by itself without any request from the relay 120 and inform the relay 120 of information on the radio resource allocation.

A scheduler (not shown) in the base station 110 allocates particular radio resources either from a request for radio resource allocation or by itself without any request from the relay 120. In one embodiment, particular RBs are allocated as the radio resources.

RB refers to the basic unit for allocation of resources which belong to an RF band such as in an Orthogonal Frequency Division Multiplexing (OFDM) system, with a frequency axis representing a component carrier and a time axis representing a symbol. For reference, the minimum transmission unit in an LTE (Long Term Evolution) downlink frame structure using an OFDMA system is Transmission Time Interval (TTI). Each TTI (or subframe) includes two consecutive slots, i.e., even-numbered slots and odd-numbered slots. Each slot is composed of fifty RBs. For example, one RB includes I (I=0, 1, . . . , 6) symbols on a time axis and 12 subcarriers on a frequency axis. In this example, the RB is composed of 84 (=7×12) resource elements (REs). Transmission of downlink data from the base station 110 to the user equipment 130 is performed in units of RBs in some embodiments. In the LTE downlink frame structure, the downlink data transmission is performed through a physical downlink shared channel (PDSCH), and transmission of downlink control information is performed through a physical downlink control channel (PDCCH), a physical control format indicator channel (PCFICH) or a physical hybrid-ARQ (Automatic Repeat reQuest) indicator channel (PHICH). A downlink synchronization channel may include a primary synchronization channel (P-SCH) and a secondary synchronization channel (S-SCH). In addition, a reference signal is used for coherent detection and measurement of the downlink data and downlink control information.

The scheduler in the base station 110 allocates a certain number of RBs (e.g., 5 RBs as shown in FIG. 2) to allow the relay 120 to obtain a correct SI intensity measurement and informs the relay 120 of the information on radio resource allocation (information regarding the allocated RBs). In this case, the scheduler in the base station 110 loads no signal on the allocated RBs until the SI intensity is reported by the relay 120 via a measurement report channel. Since the base station 110 transmits the allocated RBs, with no signal loaded thereon, to the relay 120, the relay 120 can measure the SI intensity correctly based on the transmitted RBs, which will be described in more detail later, and report it to the base station 110 via the measurement report channel.

Figure 3:
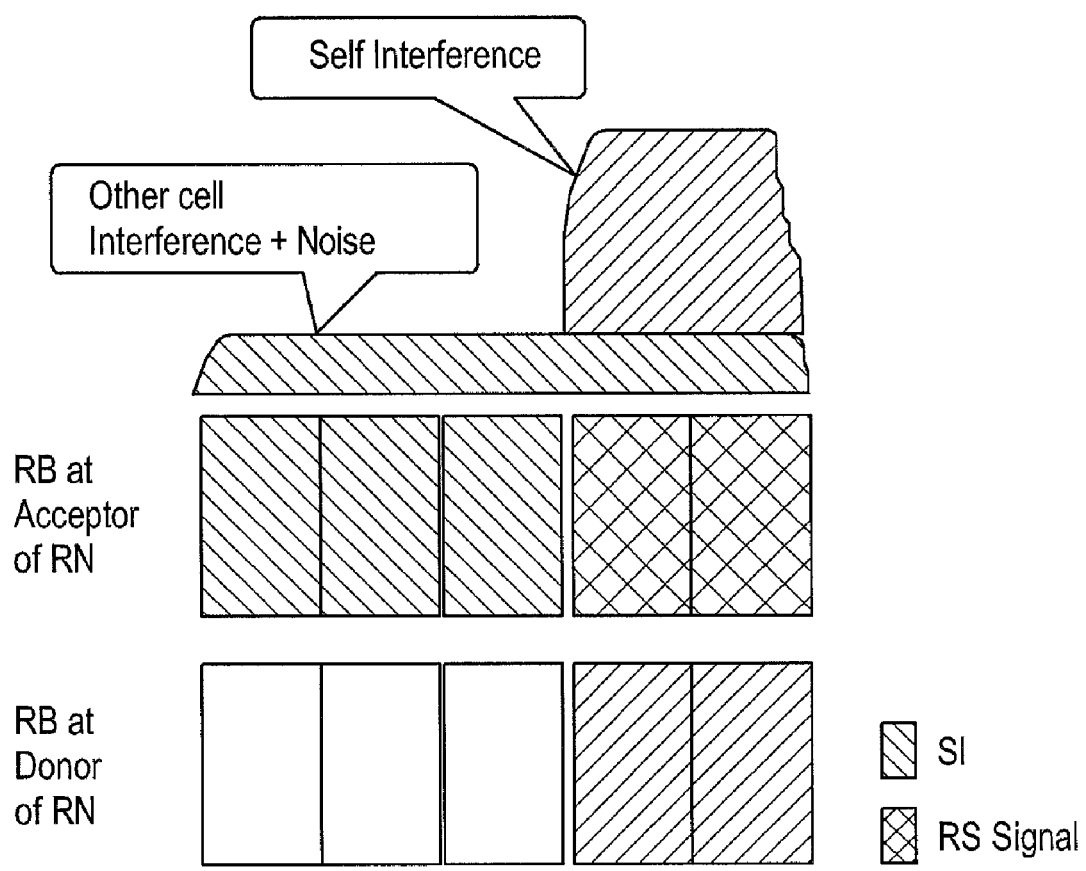
FIG. 3 is an exemplary view for explaining SI measurement using radio resources through which RS signals are transmitted according to an embodiment of the present invention.

In an alternate embodiment, the base station 110 may periodically transmit RSs with predetermined magnitude to the relay 120, with no allocation of radio resources such as RBs, for channel measurement, channel quality indicator (CQI) measurement, feedback, etc., as shown in FIG. 3. Then, the relay 120 may measure the SI intensity based on the transmitted RSs, which will be described in more detail later, using a channel through which the base station 110 transmits the RSs. The measured SI intensity is reported to the base station 110 via the measurement report channel.

Figure 4:
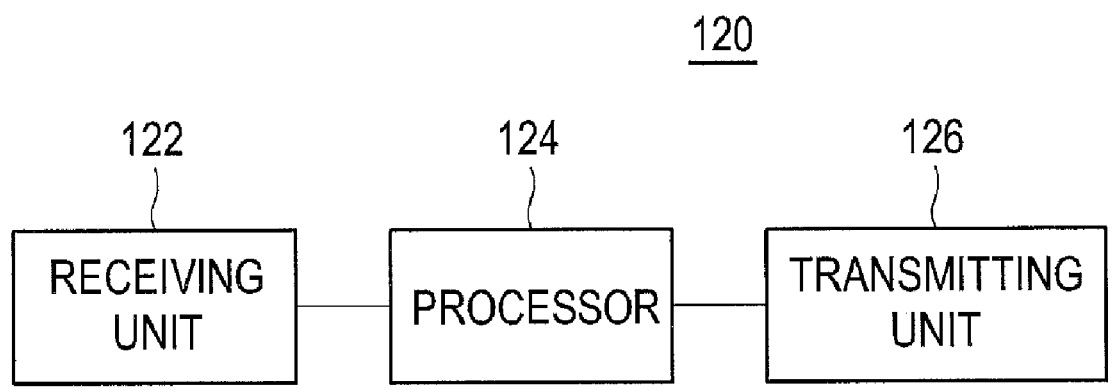
FIG. 4 is a block diagram showing a configuration of a relay according to an embodiment of the present invention.

FIG. 4 is a block diagram showing a configuration of the relay 120 according to an embodiment of the present invention. As shown in FIG. 4, the relay 120 includes a receiving unit 122, a processor 124 and a transmitting unit 126.

Interference existing in the receiving unit 122 in the relay 120 may include interference and thermal noise, which may be introduced from other cells, and self-interference. The intensity of a signal received by the receiving unit 122 is defined by the following Equation 1:

$$I = S + I_{other\_cell} + I_{self} + N_0$$

wherein I represents the intensity of a signal received by the receiving unit 122, S represents a signal component inherent to the receiving unit 122, $I_{other\_cell}$ represents an interference introduced from other cells, $I_{self}$ represents self-interference, and $N_0$ represents a thermal noise.

The processor 124 measures the intensity of the signal received by the receiving unit 122, calculates the intensity of self-interference using the measured signal intensity, and transmits information on the calculated intensity to the base station 110. In addition, the processor 124 may request the base station 110 to allocate radio resources.

In one embodiment, the processor 124 may measure first signal intensity I received by the receiving unit 122 in order to measure SI introduced in the receiving unit 122 (in this case, the base station 110 transmits no signal in the RBs allocated by the scheduler of the base station 110). In this case, the first signal intensity I is equal to the sum of an interference $I_{other\_cell}$ introduced from other cells and a thermal noise $N_0$. This is because interference inherent to the receiving unit 122 is zero (0). Thereafter, the processor 124 may transmit a particular signal with known intensity, which is transmitted in the RBs (which may be known from radio resource allocation information) allocated by the scheduler of the base station 110, and measure second signal intensity I fed back to the receiving unit 122. The processor 124 may obtain a difference between the first signal intensity and the second signal intensity to calculate the intensity of SI in the relay 120. The processor 124 reports information on the calculated SI intensity, for example, a measured value or a state value more or less than a threshold, to the base station 110 via the measurement report channel.

In an alternate embodiment, the processor 124 may use a channel transmitting an RS to measure a third signal intensity, which is the sum of an interference $I_{other\_cell}$ introduced from other cells, a thermal noise $N_0$ and intensity of the RS. Processor 124 may transmit a particular signal with known intensity to the user equipment 130. The processor 124 may transmit a particular signal with known intensity to the user equipment and measure a fourth signal intensity fed back to the receiving unit 122. The processor 124 may obtain a difference between the third signal intensity and the fourth signal intensity to calculate the intensity of SI in the relay 120.

The processor 124 may directly report the calculated SI intensity to the base station 110 or report information on whether the calculated SI intensity is larger or smaller than a set threshold to the base station 110. A period in which the relay 120 performs a series of procedures, including measuring the SI intensity and reporting it to the base station 110, may be known from the base station 110 to the relay 120 via an upper level (for example, Layer 3) signaling.

The base station 110 may use the SI intensity reported from the relay 120 to perform radio resource management. For example, if the SI intensity is high, the base station 110 can root out SI by separating RBs of a donor and an acceptor from each other. This may exhibit a characteristic of a frequency hopping relay. On the other hand, if the SI intensity is negligible, RBs of a donor and an acceptor may be collectively used to conserve radio resources. Furthermore, it is possible to operate RBs collectively or separately in an adaptive manner depending on a level of the SI intensity.

Any reference in this specification to "one embodiment," "an embodiment," "alternate embodiment," "example embodiment," "illustrative embodiment," etc. means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to affect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile telecommunication system comprising:
   a base station; and
   a relay that determines intensity of self-interference (SI) and reports the determined SI intensity to the base station, wherein the base station performs radio resource management based on information on the SI intensity reported by the relay, wherein the base station allocates and transmits a predetermined resource block (RB), with no signal loaded thereon, to allow the relay to determine the SI intensity information, and wherein the relay determines the SI intensity based on a difference between an intensity of a first signal received and measured with no signal loaded on the RB and an intensity of a second signal measured at a receiving part with a signal loaded on the RB.

2. A mobile telecommunication system comprising:
   a base station; and
   a relay that determines intensity of self-interference (SI) and provides the SI intensity to the base station, wherein the base station performs radio resource management based on information on the SI intensity provided by the relay, wherein the relay determines the SI intensity using a channel through which the base station transmits a signal at a predetermined period for channel measurement, channel quality indicator (CQI) measurement and feedback.

3. The mobile telecommunication system according to claim 2, wherein the relay determines the SI intensity based on a difference between an intensity of a signal measured with no signal transmitted and an intensity of a signal measured with a signal transmitted.

4. The mobile telecommunication system according to claim 3, wherein the information on the SI intensity is a measured value.

5. The mobile telecommunication system according to claim 4, wherein the relay transmits the information on the SI intensity at the predetermined period via a measurement report channel.

6. The mobile telecommunication system according to claim 5, wherein the base station transmits the information on the SI intensity to the relay at the predetermined period via a Layer 3 signaling.

7. The mobile telecommunication system according to claim 6, wherein the information on the SI intensity is a result value obtained by comparison between the measured value and a threshold of the SI intensity.

8. A relay of a mobile telecommunication system, wherein the relay calculates intensity of self-interference (SI) based on a difference between intensity of a first signal received and measured with no signal loaded on a resource block (RB) allocated by a base station and intensity of a second signal measured at a receiving part with a signal loaded on the RB, and reports information on the calculated SI intensity to the base station.

9. The relay according to claim 8, wherein the base station allocates a predetermined resource block (RB), with no signal loaded thereon, to allow the relay to calculate the SI intensity, and performs radio resource management based on the information on the SI intensity reported by the relay.

10. A method for controlling radio resources, the method comprising:
    determining, at a relay, intensity of self-interference (SI) and providing the determined SI intensity from the relay to a base station; and
    performing radio resource management at the base station based on information on the SI reported by the relay, wherein the base station allocates and transmits a predetermined resource block (RB), with no signal loaded thereon, to allow the relay to determine the SI intensify information, and
    wherein the relay determines the SI intensity based on a difference between an intensity of a first signal received and measured with no signal loaded on the RB and an intensity of a second signal measured at a receiving part with a signal loaded on the RB, and the relay transmits information on the SI intensity to the base station.

11. The method according to claim 10, wherein a base station channel used by the relay to determine the information on the SI intensity is a reference signal (RS) channel.

12. The method according to claim 11, wherein the information on the SI intensity includes at least one of a measured value and a result value obtained by comparison between the measured value and a threshold of the SI intensity.

13. The method according to claim 12, wherein the relay transmits the information on the SI intensity at the predetermined period via a measurement report channel.

14. The method according to claim 13, wherein the base station transmits the information on the SI intensity to the relay at the predetermined period via Layer 3 signaling.

15. A method for controlling radio resources, the method comprising:
  determining intensity of self-interference (SI) and providing the SI intensity from a relay to a base station; and
  performing radio resource management at the base station based on information on the SI reported by the relay, wherein the relay determines the SI intensity using a channel through which the base station transmits a signal at a predetermined period for channel measurement, channel quality indicator (CQI) measurement and feedback, and the relay transmits information on the SI intensity to the base station.

* * * * *